(12) United States Patent
Yamada et al.

(10) Patent No.: US 11,283,565 B2
(45) Date of Patent: Mar. 22, 2022

(54) BASE STATION APPARATUS, TERMINAL APPARATUS, AND COMMUNICATION METHOD

(71) Applicants: SHARP KABUSHIKI KAISHA, Sakai (JP); FG INNOVATION COMPANY LIMITED, Tuen Mun (HK)

(72) Inventors: Ryota Yamada, Sakai (JP); Hiromichi Tomeba, Sakai (JP)

(73) Assignees: FG Innovation Company Limited, Hong Kong (HK); Sharp Kabushiki Kaisha, Osaka (JP)

(*) Notice: Subject to any disclaimer, the term of this patent is extended or adjusted under 35 U.S.C. 154(b) by 51 days.

(21) Appl. No.: 16/644,113

(22) PCT Filed: Sep. 10, 2018

(86) PCT No.: PCT/JP2018/033489
§ 371 (c)(1),
(2) Date: Mar. 3, 2020

(87) PCT Pub. No.: WO2019/065189
PCT Pub. Date: Apr. 4, 2019

(65) Prior Publication Data
US 2020/0274668 A1 Aug. 27, 2020

(30) Foreign Application Priority Data
Sep. 28, 2017 (JP) .............................. JP2017-187871

(51) Int. Cl.
*H04W 52/42* (2009.01)
*H04L 5/00* (2006.01)
(Continued)

(52) U.S. Cl.
CPC .......... *H04L 5/0048* (2013.01); *H04B 7/0626* (2013.01); *H04L 41/0806* (2013.01); *H04L 5/0007* (2013.01); *H04W 52/42* (2013.01)

(58) Field of Classification Search
CPC ..... H04L 5/0048; H04L 5/005; H04L 5/0073; H04L 25/0204; H04L 5/0023;
(Continued)

(56) References Cited

U.S. PATENT DOCUMENTS

2014/0185480 A1* 7/2014 Lee ...................... H04W 36/30
370/252
2017/0222768 A1* 8/2017 Lee ...................... H04L 25/0204
(Continued)

OTHER PUBLICATIONS

"IMT Vision—Framework and overall objectives of the future development of IMT for 2020 and beyond", Recommendation ITU-R M.2083-0, Sep. 2015.
(Continued)

*Primary Examiner* — Eva Y Puente
(74) *Attorney, Agent, or Firm* — Imperium Patent Works

(57) ABSTRACT

An apparatus includes: a higher layer processing unit configured to configure multiple channel state information reference signal (CSI-RS) resources and assistance information; a transmitter configured to transmit CSI-RSs by using the multiple CSI-RS resources; and a receiver configured to receive, from the terminal apparatus, information (CRI) indicating one CSI-RS resource of the multiple CSI-RS resources. The assistance information is information for assisting the terminal apparatus in cancelling or suppressing neighbor cell interference, and one or more of the assistance information is configured for the CRI.

7 Claims, 5 Drawing Sheets

(51) Int. Cl.
*H04B 7/06* (2006.01)
*H04L 41/0806* (2022.01)

(58) Field of Classification Search
CPC . H04L 5/0053; H04L 25/0224; H04L 5/0035; H04L 5/0007; H04L 5/0057; H04L 5/0094; H04W 24/10; H04W 52/243; H04W 52/322; H04W 72/005; H04W 24/08; H04W 72/042; H04W 56/001; H04W 24/02; H04W 28/0289; H04W 36/04; H04W 36/30; H04W 64/00; H04W 72/082; H04B 7/04; H04B 7/0854; H04B 17/345; H04B 7/0626; H04B 15/00; H04B 1/1027; H04B 7/063; H04B 7/0632; H04B 7/024; H04B 7/0413; H04B 7/0417; H04B 7/0478; H04B 7/0639

USPC .................................................. 370/254
See application file for complete search history.

(56) References Cited

U.S. PATENT DOCUMENTS

| | | | |
|---|---|---|---|
| 2020/0014450 A1* | 1/2020 | Park | H04B 7/0456 |
| 2020/0136682 A1* | 4/2020 | Faxer | H04B 7/0639 |
| 2021/0135724 A1* | 5/2021 | Yamada | H04W 72/0446 |

OTHER PUBLICATIONS

E. G. Larsson et al.: "Massive MIMO for Next Generation Wireless Systems", IEEE Communications Magazine, vol. 52, No. 2, pp. 186-195, Feb. 2014.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

This application claims priority to JP 2017-187871 filed on Sep. 28, 2017, the contents of which are incorporated herein by reference.

BACKGROUND ART

Research and development activities related to 5th generation mobile radio communication systems (5G system) have been actively carried out, aiming to start commercial services around the year 2020. A vision recommendation on the standard system of the 5G system (International mobile telecommunication-2020 and beyond: IMT-2020) was recently reported (see NPL 1) by the International Telecommunication Union Radio communications Sector (ITU-R), which is an international standardization body.

Providing sufficient frequency resources is an important challenge for a communication system to handle a surge in data traffic. Thus, a target of 5G is to achieve ultra-high capacity communication using a frequency band higher than the frequency band used in LTE (Long term evolution).

However, in radio communication using high frequency bands, path loss is a problem. For compensation for path loss, beamforming based on a multiplicity of antennas has been a promising technique (see NPL 2).

CITATION LIST

Non Patent Literature

NPL 1: "IMT Vision—Framework and overall objectives of the future development of IMT for 2020 and beyond," Recommendation ITU-R M. 2083-0, September 2015.

NPL 2: "E. G. Larsson, O. Edfors, F. Tufvesson, and T. L. Marzetta, "Massive MIMO for next generation wireless system," IEEE Commun. Mag., vol. 52, no. 2, pp. 186-195, February 2014.

SUMMARY OF INVENTION

Technical Problem

However, in a communication system including multiple base station apparatuses, especially in a cellular system, beamforming based on multiple antennas results stochastically in strong received signals due to beamforming from the multiple base station apparatuses.

In view of these circumstances, an object of the present invention is to provide a base station apparatus, a terminal apparatus, and a communication method that can improve frequency efficiency or throughput in a case that multiple base station apparatuses perform transmission based on beamforming.

Solution to Problem

To achieve the above-mentioned object, a base station apparatus, a terminal apparatus, and a communication method according to an aspect of the present invention are configured as follows.

A base station apparatus according to an aspect of the present invention is a base station apparatus for communicating with a terminal apparatus, the base station apparatus including: a higher layer processing unit configured to configure multiple channel state information reference signal (CSI-RS) resources and assistance information; a transmitter configured to transmit CSI-RSs by using the multiple CSI-RS resources; and a receiver configured to receive, from the terminal apparatus, information (CRI) indicating one CSI-RS resource of the multiple CSI-RS resources, wherein the assistance information is information for assisting the terminal apparatus in cancelling or suppressing neighbor cell interference, the assistance information includes at least one of a cell ID, a subcarrier spacing, a demodulation reference signal (DMRS) configuration, the number of DMRS antenna ports, power offset between a reference signal and PDSCH, or the number of layers, and one or more of the assistance information is configured for the CRI.

In the base station apparatus according to an aspect of the present invention, the multiple CSI-RS resources are divided into multiple groups, and the CRI is received for each of the groups.

A terminal apparatus according to an aspect of the present invention is a terminal apparatus for communicating with a base station apparatus, the terminal apparatus including: a higher layer processing unit for which multiple channel state information reference signal (CSI-RS) resources and assistance information are configured; a receiver configured to receive CSI-RSs by using the multiple CSI-RS resources; a measuring unit configured to generate channel state information (CSI) from the CSI-RSs; and a transmitter configured to transmit the CSI to the base station apparatus, wherein the CSI includes information (CRI) indicating one CSI-RS resource of the multiple CSI-RS resources, the assistance information is information for assisting the terminal apparatus in canceling or suppressing neighbor cell interference, the assistance information includes at least one of a cell ID, a subcarrier spacing, a demodulation reference signal (DMRS) configuration, the number of DMRS antenna ports, power offset between a reference signal and PDSCH, or the number of layers, and one or more of the assistance information is configured for the CRI.

In the terminal apparatus according to an aspect of the present invention, the multiple CSI-RS resources are divided into multiple groups, and the CRI is determined for each of the groups.

The transmitter transmits a downlink shared channel and CRI associated with demodulation of the downlink shared channel, and cancels or suppresses an interference signal by using the assistance information associated with the CRI.

A communication method according to an aspect of the present invention is a communication method for a base station apparatus for communicating with a terminal apparatus, the communication method including the steps of: configuring multiple channel state information reference signal (CSI-RS) resources and assistance information; transmitting CSI-RSs by using the multiple CSI-RS resources; and receiving, from the terminal apparatus, information (CRI) indicating one CSI-RS resource of the multiple CSI-RS resources, wherein the assistance information is information for assisting the terminal apparatus in cancelling or suppressing neighbor cell interference, the assistance information includes at least one of a cell ID, a subcarrier spacing, a demodulation reference signal (DMRS) configuration, the number of DMRS antenna ports, power offset between a reference signal and PDSCH, or the number of layers, and one or more of the assistance information is configured for the CRI.

A communication method according to an aspect of the present invention is a communication method for a terminal apparatus for communicating with a base station apparatus, the communication method including the steps of: configuring, for the terminal apparatus, multiple channel state information reference signal (CSI-RS) resources and assistance information; receiving CSI-RSs by using the multiple CSI-RS resources; generating channel state information (CSI) from the CSI-RSs; and transmitting the CSI to the base station apparatus, wherein the CSI includes information (CRI) indicating one CSI-RS resource of the multiple CSI-RS resources, the assistance information is information for assisting the terminal apparatus in cancelling or suppressing neighbor cell interference, the assistance information includes at least one of a cell ID, a subcarrier spacing, a demodulation reference signal (DMRS) configuration, the number of DMRS antenna ports, power offset between a reference signal and PDSCH, or the number of layers, and one or more of the assistance information is configured for the CRI.

Advantageous Effects of Invention

According to an aspect of the present invention, the base station apparatus or the terminal apparatus can efficiently control, cancel, or suppress interference to improve frequency efficiency or throughput.

DESCRIPTION OF EMBODIMENTS

A communication system according to the present embodiment includes a base station apparatus (a transmission apparatus, a cell, a transmission point, a group of transmit antennas, a group of transmit antenna ports, a component carrier, an eNodeB, a transmission point, a transmission and/or reception point, a transmission panel, or an access point) and a terminal apparatus (a terminal, a mobile terminal, a reception point, a reception terminal, a reception apparatus, a group of receive antennas, a group of receive antenna ports, UE, a reception point, a reception panel, or a station). A base station apparatus connected to a terminal apparatus (base station apparatus that establishes a radio link with a terminal apparatus) is referred to as a serving cell.

The base station apparatus and the terminal apparatus in the present embodiment can communicate in a licensed band and/or an unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

Figure 1:
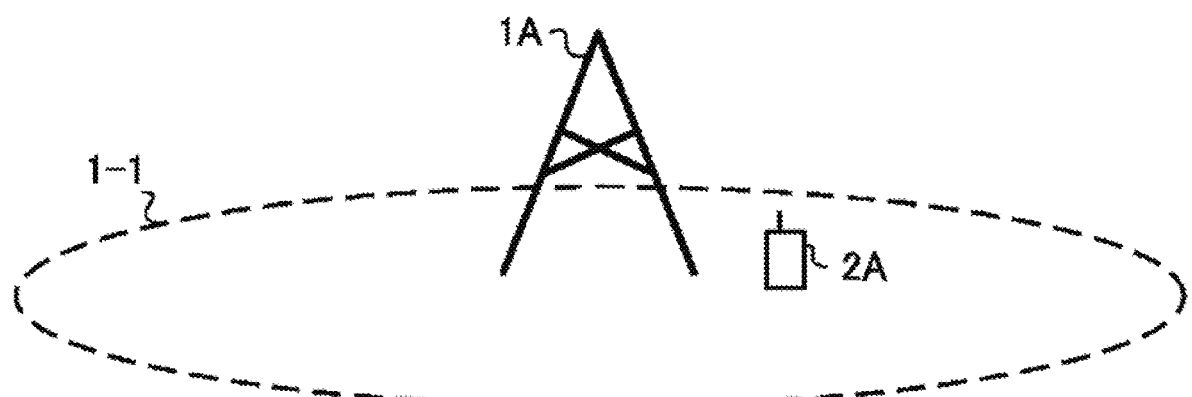
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. Coverage 1-1 is a range (a communication area) in which the base station apparatus 1A can connect to the terminal apparatuses. The base station apparatus 1A is also simply referred to as a base station apparatus. The terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared Channel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) for specifying a preferable spatial multiplexing number, a Precoding Matrix Indicator (PMI) for specifying a preferable precoder, a Channel Quality Indicator (CQI) for specifying a preferable transmission rate, a CSI-Reference Signal (RS) Resource Indicator (CRI) for specifying a preferable CSI-RS resource, and the like.

The Channel Quality Indicator (hereinafter, referred to as a CQI value) can be a preferable modulation scheme (e.g., QPSK, 16QAM, 64QAM, 256QAM, or the like) and a preferable coding rate in a prescribed band (details of which will be described later). The CQI value can be an index (CQI Index) determined by the above change scheme, coding rate, and the like. The CQI value can take a value predetermined in the system.

The CRI indicates a CSI-RS resource included in the multiple CSI-RS resources and having preferable received power/reception quality.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that some or all of the CQI value, PMI value, RI value, and CRI value are also collectively referred to as a CSI value.

PUSCH is used for transmission of uplink data (an uplink transport block, UL-SCH). PUSCH may be used for transmission of ACK/NACK and/or Channel State Information along with the uplink data. PUSCH may be used to transmit the uplink control information only.

PUSCH is used to transmit an RRC message. The RRC message is a signal/information that is processed in a Radio Resource Control (RRC) layer. PUSCH is used to transmit a MAC Control Element (CE). Here, MAC CE is a signal/ information that is processed (transmitted) in a Medium Access Control (MAC) layer.

For example, a power headroom may be included in MAC CE and may be reported via PUSCH. In other words, a MAC CE field may be used to indicate a level of the power headroom.

PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. Here, the Uplink Reference Signal includes a Demodulation Reference Signal (DMRS), a Sounding Reference Signal (SRS), and a Phase-Tracking reference signal (PT-RS).

DMRS is associated with transmission of PUSCH or PUCCH. For example, the base station apparatus 1A uses DMRS in order to perform channel compensation of PUSCH or PUCCH. For example, the base station apparatus 1A uses SRS to measure an uplink channel state. SRS is used for uplink observation (sounding). PT-RS is used to compensate for phase noise. Note that the DMRS in the uplink is also referred to as an uplink DMRS.

In FIG. 1, the following downlink physical channels are used for the downlink radio communication from the base station apparatus 1A to the terminal apparatus 2A. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH, HARQ indicator channel)
Physical Downlink Control Channel (PDCCH)
Enhanced Physical Downlink Control Channel (EPDCCH)
Physical Downlink Shared Channel (PDSCH)

PBCH is used for broadcasting a Master Information Block (MIB, a Broadcast Channel (BCH)) that is shared by the terminal apparatuses. PCFICH is used for transmission of information for indicating a region (e.g., the number of Orthogonal Frequency Division Multiplexing (OFDM) symbols) to be used for transmission of PDCCH. Note that MIB is also referred to as minimum system information.

PHICH is used for transmission of ACK/NACK with respect to uplink data (a transport block, a codeword) received by the base station apparatus 1A. In other words, PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and DTX for indicating that no corresponding data is present. In a case that PHICH for uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

The DCI format for the uplink can be used to request Channel State Information (CSI; also referred to as reception quality information) for the downlink (CSI request).

The DCI format for the uplink can be used for a configuration for indicating an uplink resource to which a channel state information report (CSI feedback report) is mapped, the Channel State Information report being fed back to the base station apparatus by the terminal apparatus. For example, the Channel State Information report can be used for a configuration for indicating an uplink resource that periodically reports Channel State Information (Periodic CSI). The Channel State Information report can be used for a mode configuration (CSI report mode) for periodically reporting the Channel State Information.

For example, the Channel State Information report can be used for a configuration for indicating an uplink resource that reports aperiodic Channel State Information (Aperiodic CSI). The Channel State Information report can be used for a mode configuration (CSI report mode) for aperiodically reporting the Channel State Information.

For example, the Channel State Information report can be used for a configuration indicating an uplink resource for reporting semi-persistent Channel State Information (CSI). The Channel State Information report can be used for a mode configuration (CSI report mode) for semi-persistently reporting the Channel State Information. Note that the semi-persistent CSI report is periodic CSI reporting during a period from activation to deactivation in the higher layer.

The DCI format for the uplink can be used for a configuration for indicating a type of the channel state information report that is fed back to the base station apparatus by the terminal apparatus. The type of the channel state information report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PUSCH resource is scheduled in accordance with the uplink grant, the terminal apparatus transmits uplink data and/or uplink control information on the scheduled PUSCH.

PDSCH is used to transmit downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. The RRC message transmitted from the base station apparatus 1A may be a dedicated message to a given terminal apparatus 2A (also referred to as dedicated signaling). In other words, user equipment specific information (unique to user equipment) is transmitted by using a message dedicated to the given terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a Channel State Information report (CSI feedback report) is mapped, the Channel State Information report being fed back to the base station apparatus by the terminal apparatus. For example, the Channel State Information report can be used for a configuration for indicating an uplink resource that periodically reports Channel State Information (Periodic CSI). The Channel State Information report can be used for a mode configuration (CSI report mode) for periodically reporting the Channel State Information.

The type of the downlink Channel State Information report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer. Note that the synchronization signals include Primary Synchronization Signals (PSSs) and Secondary Synchronization Signals (SSSs).

The synchronization signal is used for the terminal apparatus to take synchronization in the frequency domain and the time domain in the downlink. The synchronization signal is also used to measure received power, reception quality, or a Signal-to-Interference and Noise power Ratio (SINR). Note that the received power measured with the synchronization signal is also referred to as Synchronization Signal-Reference Signal Received Power (SS-RSRP) and that the reception quality measured with the synchronization signal is also referred to as Synchronization Signal-Reference Signal Received Quality (SS-RSRQ) and that the SINR measured with the synchronization signal is also referred to as SS-SINR. Note that SS-RSRQ is the ratio of SS-RSRP to RSSI. A Received Signal Strength Indicator (RSSI) is the total average received power during a certain observation period. A synchronization signal/downlink reference signal is used for the terminal apparatus to perform channel compensation for a downlink physical channel. For example, the synchronization signal/downlink reference signal is used for the terminal apparatus to calculate the downlink Channel State Information.

Here, the Downlink Reference Signals include a Cell-specific Reference Signal (CRS), a Demodulation Reference Signal (DMRS), a Non-Zero Power Chanel State Information-Reference Signal (NZP CSI-RS), a Zero Power Chanel State Information-Reference Signal (ZP CSI-RS), PT-RS, and a Tracking Reference Signal (TRS). Note that the DMRS in the downlink is also referred to as a downlink DMRS. Note that in the following embodiments, a simple reference of CSI-RS includes NZP CSI-RS and/or ZP CSI-RS.

CRS is transmitted in an entire band of a subframe and is used to perform demodulation of PBCH/PDCCH/PHICH/PCFICH/PDSCH. DMRS is transmitted in a subframe and a band that are used for transmission of PDSCH/PBCH/PDCCH/EPDCCH associated with DMRS, and is used to demodulate PDSCH/PBCH/PDCCH/EPDCCH associated with DMRS.

A resource for NZP CSI-RS is configured by the base station apparatus 1A. For example, the terminal apparatus 2A performs signal measurement (channel measurement) by using NZP CSI-RS. NZP CSI-RS is also used for, for example, beam scanning for searching for a preferable beam direction or beam recovery in which the received power/reception quality in the beam direction is recovered in a case that the received power is reduced or the reception quality is degraded. A resource for ZP CSI-RS is configured by the base station apparatus 1A. With zero output, the base station apparatus 1A transmits ZP CSI-RS. The terminal apparatus 2A performs interference measurement in a resource to which ZP CSI-RS corresponds, for example.

CSI-RS is used to measure the received power, reception quality, or SINR. The received power measured by using CSI-RS is also referred to as CSI-RSRP, the reception quality measured by using CSI-RS is also referred to as CSI-RSRQ, and SINR measured by using CSI-RS is also referred to as CSI-SINR. Note that CSI-RSRQ is the ratio of CSI-RSRP to RSSI.

A Multimedia Broadcast multicast service Single Frequency Network (MBSFN) RS is transmitted in an entire band of the subframe used for transmitting PMCH. MBSFN RS is used to demodulate PMCH. PMCH is transmitted through the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Furthermore, for terminal apparatuses that supports Carrier Aggregation (CA), the base station apparatus can integrate multiple Component Carriers (CCs) for transmission in a broader band to perform communication. In carrier aggregation, one Primary Cell (PCell) and one or more Secondary Cells (SCells) are configured as a set of serving cells.

Furthermore, in Dual Connectivity (DC), a Master Cell Group (MCG) and a Secondary Cell Group (SCG) are configured as a group of serving cells. MCG includes a PCell and optionally one or more SCells. Furthermore, SCG includes a primary SCell (PSCell) and optionally one or more SCells.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

A slot includes 14 OFDM symbols. An OFDM symbol length may vary depending on a subcarrier spacing, and thus a slot length may also vary depending on the subcarrier spacing. A mini-slot includes fewer OFDM symbols than the slot. The slot/mini-slot can be used as a scheduling unit. Note that the terminal apparatus can learn slot-based scheduling/mini-slot-based scheduling, based on the position (allocation) of the first downlink DMRS. In the slot-based scheduling, the first downlink DMRS is allocated in the third or fourth symbol in the slot. In the mini-slot-based scheduling, the first downlink DMRS is allocated in the first symbol in the scheduled data (resource or PDSCH).

A resource block is also defined by 12 contiguous subcarriers. A resource element is defined by an index in the frequency domain (e.g., a subcarrier index) and an index in the time domain (e.g., an OFDM symbol index). Resource elements are classified into uplink resource elements, downlink elements, flexible resource elements, and reserved resource elements. In the reserved resource elements, the terminal apparatus transmits no uplink signal and receives no downlink signal.

Multiple Subcarrier spacings (SCSs) are supported. For example, SCSs are 15/30/60/120/240/480 kHz.

The base station apparatus/the terminal apparatus can communicate in a licensed band or an unlicensed band. The base station apparatus/terminal apparatus uses the licensed band as a PCell and can communicate, by using carrier aggregation, with at least one SCell operating in the unlicensed band. The base station apparatus/terminal apparatus can communicate, based on dual connectivity in which a master cell group communicates in the licensed band, whereas a secondary cell group communicates in the unlicensed band. The base station apparatus/terminal apparatus can communicate by using only PCell in the unlicensed band. The base station apparatus/terminal apparatus can communicate only in the unlicensed band by using CA or DC. Note that Licensed-Assisted Access (LAA) refers to communication using the licensed band as PCell and assisting the cell in the unlicensed band (SCell or PSCell) by using, for example, CA, DC, or the like. Communication of the base station apparatus/terminal apparatus only in the unlicensed band is also referred to as Unlicensed-standalone access (ULSA). Communication of the base station apparatus/terminal apparatus only in the licensed band is also referred to as Licensed Access (LA).

Figure 2:
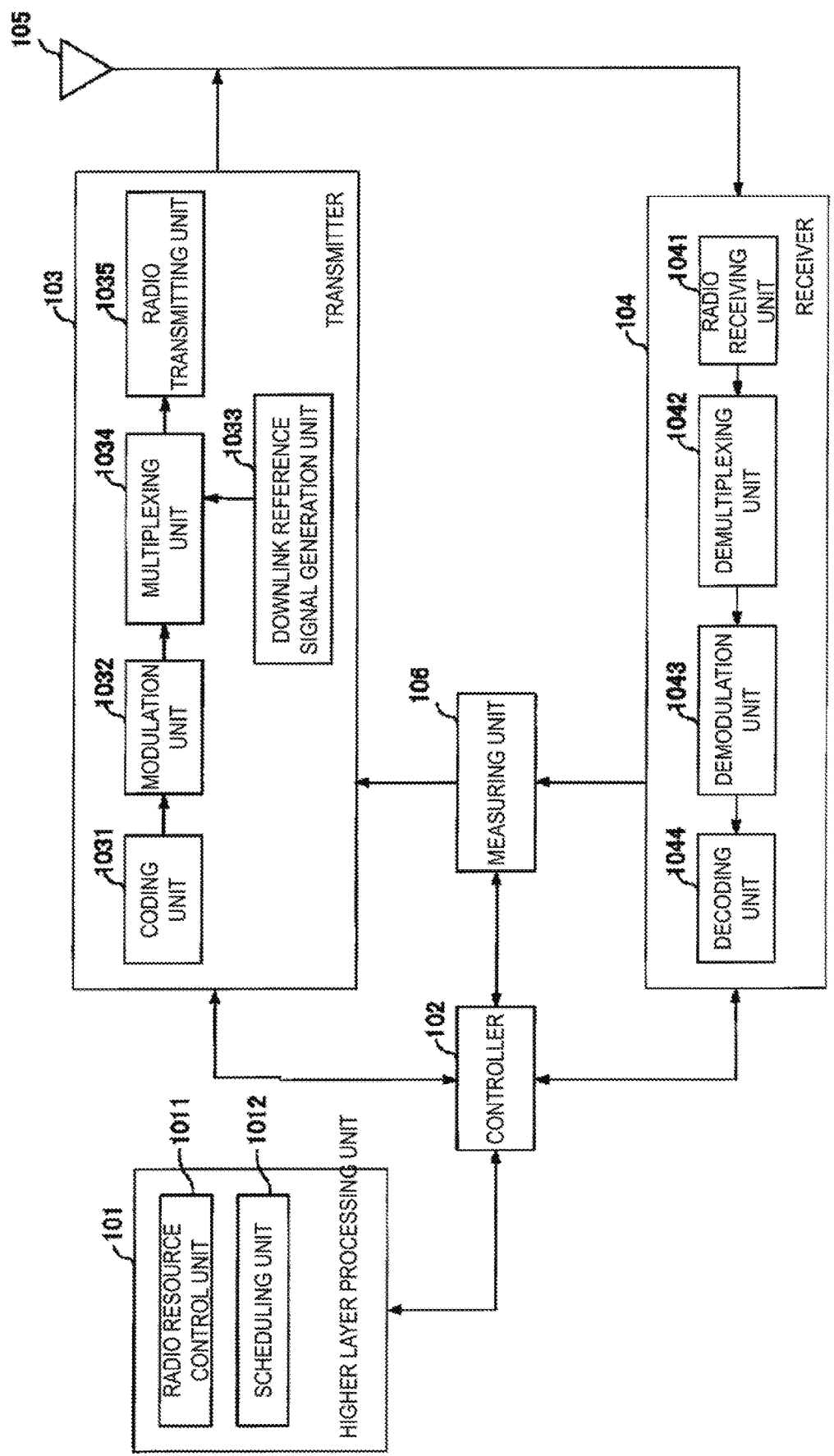
FIG. 2 is a block diagram illustrating a configuration example of a base station apparatus according to the present embodiment.

FIG. 2 is a schematic block diagram illustrating a configuration of the base station apparatus according to the present embodiment. As illustrated in FIG. 2, the base station apparatus includes a higher layer processing unit (higher layer processing step) 101, a controller (controlling step) 102, a transmitter (transmitting step) 103, a receiver (receiving step) 104, a transmit and/or receive antenna 105, and a measuring unit (measuring step) 106. The higher layer processing unit 101 is configured to include a radio resource control unit (radio resource controlling step) 1011 and a scheduling unit (scheduling step) 1012. The transmitter 103 is configured to include a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured to include a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the terminal apparatus transmits information (parameters) for indicating whether the prescribed function is supported. In a case that a terminal apparatus does not support a prescribed function, the terminal apparatus does not transmit information (parameters) for indicating whether the prescribed function is supported. In other words, whether the prescribed function is supported is reported by whether information (parameters) indicating whether the prescribed function is supported is transmitted. The information (parameters) indicating whether the prescribed function is supported may be reported using one bit of 1 or 0.

The radio resource control unit 1011 generates, or acquires from a higher node, the downlink data (the transport block) allocated in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

In accordance with a control signal input from the controller 102, the transmitter 103 generates a downlink reference signal, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2A through the transmit and/or receive antenna 105.

The coding unit 1031 codes the HARQ indicator, the downlink control information, and the downlink data that are input from the higher layer processing unit 101, in compliance with a predetermined coding scheme such as block coding, convolutional coding, turbo coding, Low density parity check (LDPC) coding, or Polar coding or in compliance with a coding scheme determined by the radio resource control unit 1011. The modulation unit 1032 modulates the coded bits input from the coding unit 1031, in compliance with the modulation scheme prescribed in advance, such as Binary Phase Shift Keying (BPSK), quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like to generate an OFDM symbol, adds a cyclic prefix (CP) to the generated OFDM symbol to generate a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, cancels unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 cancels a portion corresponding to CP from the digital signal resulting from the conversion. The radio receiving unit 1041 performs Fast Fourier Transform (FFT) of the signal from which the CP has been cancelled, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and uplink reference signal. The demultiplexing is performed based on radio resource allocation information included in the uplink grant predetermined by the base station apparatus 1A by using the radio resource control unit 1011, the uplink grant being notified to each of the terminal apparatuses 2A.

The demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, acquires modulation symbols, and demodulates, for each of the modulation symbols of PUCCH and PUSCH, a reception signal in compliance with a predetermined modulation scheme, such as BPSK, QPSK, 16QAM, 64QAM, and 256QAM, or in compliance with a modulation scheme that the base station apparatus 1A notified to each of the terminal apparatuses 2A in advance by using the uplink grant.

The decoding unit 1044 decodes the coded bits of PUCCH and PUSCH that have been demodulated, at a coding rate, in compliance with a predetermined coding scheme, that is predetermined or notified from the base station apparatus 1A to the terminal apparatus 2A in advance by using the uplink grant, and outputs the decoded uplink data and uplink control information to the higher layer processing unit 101. In a case that PUSCH is retransmitted, the decoding unit 1044 performs the decoding by using the coded bits that is input from the higher layer processing unit 101 and retained in an HARQ buffer, and the demodulated coded bits.

The measuring unit 106 observes the received signal, and determines various measured values such as RSRP/RSRQ/RSSI. The measuring unit 106 determines the received power, the reception quality, and a preferable SRS resource index from the SRS transmitted from the terminal apparatus.

Figure 3:
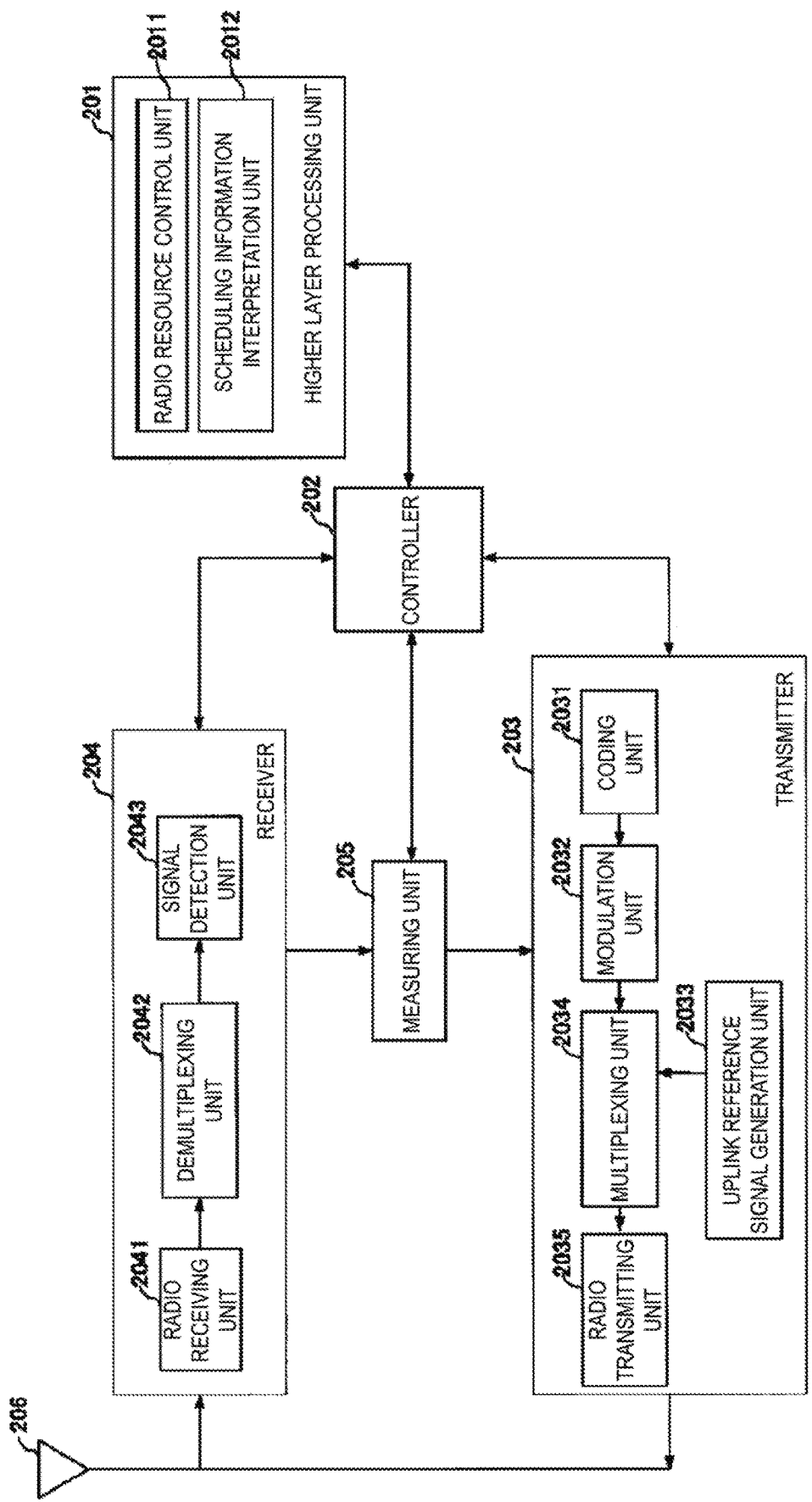
FIG. 3 is a block diagram illustrating a configuration example of a terminal apparatus according to the present embodiment.

FIG. 3 is a schematic block diagram illustrating a configuration of the terminal apparatus according to the present embodiment. As illustrated in FIG. 3, the terminal apparatus includes a higher layer processing unit (higher layer processing step) 201, a controller (controlling step) 202, a transmitter (transmitting step) 203, a receiver (receiving step) 204, a measuring unit (measuring step) 205, and a transmit and/or receive antenna 206. The higher layer processing unit 201 is configured to include a radio resource control unit (radio resource controlling stop) 2011 and a scheduling information interpretation unit (scheduling information interpreting step) 2012. The transmitter 203 includes a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 includes a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus 2A.

The radio resource control unit 2011 manages various configuration information of the terminal apparatuses 2A. The radio resource control unit 2011 generates information to be mapped to each uplink channel, and outputs the generated information to the transmitter 203.

The radio resource control unit 2011 acquires configuration information transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

Based on the information input from the higher layer processing unit 201, the controller 202 generates a control signal for controlling the receiver 204, the measuring unit 205, and the transmitter 203. The controller 202 outputs the generated control signal to the receiver 204, the measuring unit 205, and the transmitter 203 to control the receiver 204 and the transmitter 203.

The controller 202 controls the transmitter 203 to transmit the CSI/RSRP/RSRQ/RSSI generated by the measuring unit 205 to the base station apparatus.

In accordance with the control signal input from the controller 202, the receiver 204 demultiplexes, demodulates, and decodes a reception signal received from the base station apparatus through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, cancels unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 cancels a portion corresponding to CP from the digital signal resulting from the conversion, performs fast Fourier transform of the signal from which the CP has been cancelled, and extracts a signal in the frequency domain.

The demultiplexing unit 2042 demultiplexes the extracted signal into PHICH, PDCCH, EPDCCH, PDSCH, and the downlink reference signal. Furthermore, the demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043, by using PDSCH and the channel estimation value, detects a signal, and outputs the detected signal to the higher layer processing unit 201.

The measuring unit 205 performs various measurements such as CSI measurement, Radio Resource Management (RRM) measurement, and Radio Link Monitoring (RLM) measurement, and determines CSI/RSRP/RSRQ/RS SI, etc.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus through the transmit and/or receive antenna 206.

The coding unit 2031 performs coding such as convolutional coding, block coding, turbo coding, LDPC coding, or Polar coding, on the uplink control information input or uplink data from the higher layer processing unit 201.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence determined according to a prescribed rule (formula), based on a Physical Cell Identity (PCI, also referred to as a cell ID or the like) for identifying the base station apparatus, a bandwidth in which the uplink reference signal is mapped, a cyclic shift notified with the uplink grant, a parameter value for generation of a DMRS sequence, and the like.

The multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmitting unit 2035 performs Inverse Fast Fourier Transform (IFFT) on a signal resulting from the multiplexing to perform modulation for the OFDM scheme to generate an OFDMA symbol, adds CP to the generated OFDMA symbol to generate a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

Note that the terminal apparatus can perform modulation not only for the OFDMA scheme but also for the SC-FDMA scheme.

In a case that ultra-high capacity communication such as ultra-high definition video transmission is required, ultra-broadband transmission utilizing high frequency bands is desired. Transmission in high frequency bands needs to compensate for path loss, and beamforming is important. In an environment in which multiple terminal apparatuses are located in a limited area, an Ultra-dense network in which base station apparatuses are densely deployed is effective in a case that ultra-high capacity communication is required for each terminal apparatus. However, the densely deployed base station apparatuses significantly improves a Signal to noise power ratio (SNR) but may cause strong interference due to beamforming. Accordingly, for realization of ultra-high capacity communication for every terminal apparatus in the limited area, there is a need for interference control (avoidance, suppression, or cancellation) and/or coordinated communication of multiple base stations in consideration of beamforming.

Figure 4:
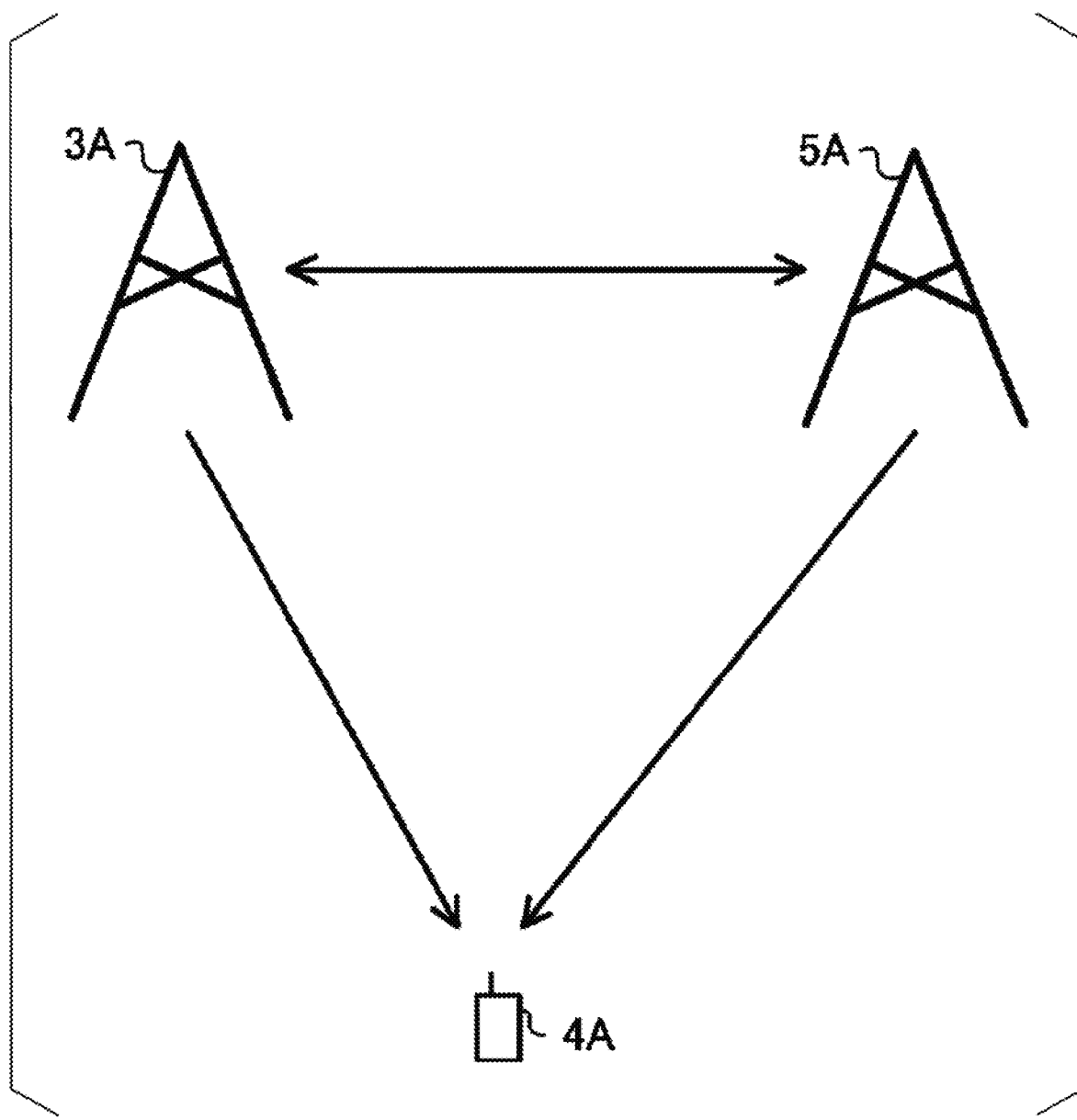
FIG. 4 is a diagram illustrating an example of a communication system according to the present embodiment.

FIG. 4 is a diagram illustrating an example of a downlink communication system according to the present embodiment. The communication system illustrated in FIG. 4 includes a base station apparatus 3A, a base station apparatus 5A, and a terminal apparatus 4A. The terminal apparatus 4A may use the base station apparatus 3A and/or the base station apparatus 5A as a serving cell. In a case that the base station apparatus 3A or the base station apparatus 5A includes a multiplicity of antennas, the multiplicity of antennas can be divided into multiple subarrays (panels or sub-panels), and transmit/receive beamforming can be applied for each subarray. In this case, each subarray may include a communication apparatus, and the configuration of the communication apparatus is the same as the configuration of the base station apparatus illustrated in FIG. 2, unless otherwise indicated. In a case of including multiple antennas, the terminal apparatus 4A can perform transmission or reception by beamforming. In a case that the terminal apparatus 4A includes multiple antennas, multiple antennas can be divided into multiple subarrays (panels or sub-panels), and different transmit/receive beamforming can be applied for each subarray. Each subarray may include a communication apparatus, and the configuration of the communication apparatus is the same as the configuration of the terminal apparatus illustrated in FIG. 3, unless otherwise indicated. Note that the base station apparatus 3A and the base station apparatus 5A are also simply referred to as base station apparatuses. Note that the terminal apparatus 4A is also simply referred to as a terminal apparatus.

A synchronization signal is used to determine a preferable transmit beam for the base station apparatus and a preferable receive beam for the terminal apparatus. The base station apparatus transmits synchronization signal blocks including PSS, PBCH, and SSS. Note that, during a synchronization signal block burst set period configured by the base station apparatus, one or multiple synchronization signal blocks are transmitted in the time domain, and a time index is configured for each synchronization signal block. The terminal apparatus may consider synchronization signal blocks with the same time index within the synchronization signal block burst set period to have been transmitted from somewhat the same location (quasi co-located: QCL), for example, the terminal apparatus may consider the synchronization signal blocks to have the same delay spread, Doppler spread, Doppler shift, average gain, average delay, spatial reception parameters, and/or spatial transmission parameters. Note that the spatial reception parameters include, for example, spatial correlation of a channel and an Angle of Arrival. The spatial transmission parameters include, for example, spatial correlation of a channel and an Angle of Departure. In other words, the terminal apparatus can assume that synchronization signal blocks with the same time index within the synchronization signal block burst set period have been transmitted in the same transmit beam and that synchronization signal blocks with different time indexes have been transmitted in different transmit beams. Accordingly, in a case that the terminal apparatus reports, to the base station apparatus, information indicating the time index of a preferable synchronization signal block within the synchronization signal block burst set period, the base station apparatus can learn a transmit beam preferable for the terminal apparatus. The terminal apparatus can determine a preferable receive beam for the terminal apparatus by using synchronization signal blocks with the same time index in different synchronization signal block burst set periods. Thus, the terminal apparatus can associate the time index of the synchronization signal block with a receive beam direction and/or the subarray. Note that, in a case of including multiple subarrays, the terminal apparatus may use a different subarray to connect to a different cell.

CSI-RS can be used to determine a preferable transmit beam for the base station apparatus and a preferable receive beam for the terminal apparatus. The base station apparatus can configure configuration information by higher layer signaling. For example, the configuration information includes a part or all of a resource configuration and a reporting configuration.

The resource configuration includes a resource configuration ID, a resource configuration type, and/or one or more CSI-RS resource set configurations. The resource configuration ID is used to identify a resource configuration. The resource configuration type indicates the operation of the resource configuration in the time domain. Specifically, the resource configuration type indicates whether the resource configuration corresponds to a configuration for aperiodic transmission of CSI-RS, a configuration for periodic transmission of CSI-RS, or a configuration for semi-persistent transmission of CSI-RS. Note that, in a case of a configuration for semi-persistent transmission of CSI-RS, CSI-RS is periodically transmitted during a period from activation in the higher layer until deactivation. The CSI-RS resource set configuration includes a CSI-RS resource set configuration ID and/or one or more CSI-RS resource configurations. The CSI-RS resource set configuration ID is used to identify the CSI-RS resource set configuration. The CSI-RS Resource configuration includes some or all of a CSI-RS resource configuration ID, a resource configuration type, the number of antenna ports, CSI-RS resource mapping, and power offset between CSI-RS and PDSCH. The CSI-RS resource configuration ID is used for identification of the CSI-RS resource configuration and for association of the CSI-RS resource. The CSI-RS resource mapping indicates resource elements (OFDM symbols or subcarriers) in the slot to which CSI-RSs are allocated.

The resource configuration is used for CSI measurement or RRM measurement. The terminal apparatus uses the configured resource to receive CSI-RS, calculate CSI from CSI-RS, and report CSI to the base station apparatus. In a case that the CSI-RS resource set configuration includes multiple CSI-RS resource configurations, the terminal apparatus uses each CSI-RS resource to receive CSI-RS in the same receive beam and calculate CRI. For example, in a case that the CSI-RS resource set configuration includes K (K is an integer of 2 or greater) CSI-RS resource configurations, CRI indicates preferable N CSI-RS resources of the K CSI-RS resources. In this case, N is a positive integer smaller than K. In a case that the CRI indicates multiple CSI-RS resources, the terminal apparatus can report CSI-RSRP measured at each CSI-RS resource to the base station apparatus to indicate which CSI-RS resource has high quality. By performing transmission of CSI-RS based on beamforming (precoding) in different beam directions using multiple configured CSI-RS resources, the base station apparatus can learn the transmit beam direction of the base station apparatus preferable for the terminal apparatus, from CRI reported from the terminal apparatus. On the other hand, the preferable receive beam direction of the terminal apparatus can be determined using the CSI-RS resource in which the transmit beam of the base station apparatus is fixed. For example, the base station apparatus transmits, for a certain CSI-RS resource, information indicating whether the transmit beam of the base station apparatus is fixed and/or the period of time during which the transmit beam is fixed. In the CSI-RS resource in which the transmit beam is fixed, the terminal apparatus can determine a preferable receive beam direction from CSI-RSs received in different receive beam directions. Note that the terminal apparatus may report CSI-RSRP after determining a preferable receive beam direction. Note that, in a case that the terminal apparatus includes multiple subarrays, the terminal apparatus can select a preferable subarray in determining a preferable receive beam direction. Note that the preferable receive beam direction of the terminal apparatus may be associated with CRI. In a case that the terminal apparatus reports multiple CRIs, the base station apparatus can fix the transmit beam in the CSI-RS resource associated with each CRI. At this time, the terminal apparatus can determine a preferable receive beam direction for each CRI. For example, the base station apparatus can transmit downlink signals/channels in association with CRI. At this time, the terminal apparatus needs to perform the reception in a receive beam associated with CRI. In the multiple configured CSI-RS resources, different base station apparatuses can transmit CSI-RS. In this case, CRI allows the network side to learn which of the base station apparatuses has high communication quality. In a case that the terminal apparatus includes multiple subarrays, the terminal apparatus can perform reception by using the multiple subarrays at the same timing. Accordingly, in a case that the base station apparatus uses the downlink control information or the like to transmit CRI in association with each of the multiple layers (codewords or transport blocks), the terminal apparatus can receive the multiple layers by using the subarray and receive beam corresponding to each CRI. However, with an analog beam, in a case that one subarray uses one receive beam direction at the same timing, and that the same timing is configured for two CRIs corresponding to one subarray of the terminal apparatus, the terminal apparatus may fail to achieve the reception in the multiple receive beams. To avoid this problem, for example, the base station apparatus groups the multiple configured CSI-RS resources, and uses the same subarray within the group to determine CRI. In a case that subarrays that differ between groups are used, the base station apparatus can learn multiple CRIs for which the same timing can be configured. Note that the CSI-RS resource group may be a CSI-RS resource set. Note that it may be assumed that the CRIs for which the same timing can be configured are in QCL. In this case, the terminal apparatus can transmit CRI in association with QCL information. For example, in a case that the terminal apparatus reports CRIs in QCL in distinction from CRIs not in QCL, the base station apparatus can avoid configuring the same timing for the CRIs in QCL and configure the same timing for the CRIs not in QCL. The base station apparatus may request CSI for each subarray of the terminal apparatus. In this case, the terminal apparatus reports CSI for each subarray. Note that, in a case that the terminal apparatus reports multiple CRI to the base station apparatus, only the CRI not in QCL may be reported.

The reporting configuration is a configuration related to the CSI report, and includes a reporting configuration ID, a reporting configuration type, and/or a reporting value (amount). The reporting configuration ID is used to identify the reporting configuration. The reporting value (amount) is a reported CSI value (amount). The reporting configuration type indicates that the reporting configuration is a configuration for aperiodic reporting of the CSI value (amount), a configuration for periodic reporting of the CSI value (amount), or a configuration for semi-persistent reporting of the CSI value (amount).

For determination of a preferable transmit beam for the base station apparatus, a codebook is used that defines candidates for a prescribed precoding (beamforming) matrix (vector). The base station apparatus transmits CSI-RS, and the terminal apparatus determines one of the candidates in the codebook to be a preferable precoding (beamforming) matrix and reports the precoding (beamforming) matrix to the base station apparatus as PMI. Thus, the base station apparatus can learn the transmit beam direction preferable for the terminal apparatus. Note that the codebook includes precoding (beamforming) matrices composing antenna ports and precoding (beamforming) matrices selecting an antenna port. In a case that a codebook for selection of an antenna port is used, the base station apparatus can use different transmit beam directions for the respective antenna ports. Accordingly, in a case that the terminal apparatus reports a preferable antenna port as PMI, the base station apparatus can learn a preferable transmit beam direction. Note that the preferable receive beam of the terminal apparatus may travel in the receive beam direction associated with CRI or that a preferable receive beam direction may be determined again. In a case that the codebook for selection of an antenna port is used and that the preferable receive beam direction of the terminal apparatus is the receive beam direction associated with CRI, the receive beam direction in which CSI-RS is received is desirably the receive beam direction associated with CRI. Note that even in a case of using the receive beam direction associated with the CRI, the terminal apparatus can associate PMI with the receive beam direction. In a case that the codebook for selection of an antenna port is used, each antenna port may be transmitted from a different base station apparatus (cell). In this case, the PMI reported by the terminal apparatus allows the base station apparatus to learn which base station apparatus (cell) provides preferable communication quality. Note that in this case, the antenna ports of different base station apparatuses (cells) can be determined not in QCL.

The terminal apparatus 4A may receive, in addition to the serving cell, interference signals from neighbor cells (neighbor cell interference). The interference signals include PDSCHs, PDCCHs, or reference signals from the neighbor cells. In this case, the cancellation or suppression of the interference signals in the terminal apparatus is effective. Applicable schemes for cancelling or suppressing interference signals include Enhanced-Minimum Mean Square Error (E-MMSE) involving estimating the channels of the interference signals and using linear weights to suppress the interference signals, an interference canceler generating replicas of the interference signals for cancelling, Maximum Likelihood Detection (MLD) involving searching all of the transmit signal candidates for the desired signal and the interference signals to detect the desired signal, and Reduced complexity-MLD (R-MLD) reducing the number of transmit signal candidates and thus involving a reduced amount of computation than the MLD. Application of these schemes needs estimation of the interference signal channels, demodulation of the interference signals, or decoding of the interference signals. Thus, for efficient cancellation or suppression of the interference signal, the terminal apparatus needs to know parameters of the interference signals (neighbor cells). Accordingly, to assist the terminal apparatus in cancelling or suppressing the interference signals, the base station apparatus can transmit (configure), to (for) the terminal apparatus, assistance information including parameters for the interference signals (neighbor cells). One or more assistance information are configured. The assistance information includes some or all of, for example, a physical cell ID, a virtual cell ID, a power ratio of the reference signal to PDSCH (power offset), a scrambling identity of the reference signal, quasi co-location information (QCL information), a CSI-RS resource configuration, the number of CSI-RS antenna ports, a subcarrier spacing, resource allocation granularity, resource allocation information, a DMRS configuration, a DMRS antenna port number, the number of layers, a TDD DL/UL configuration, PMI, RI, a modulation scheme, and a Modulation and coding scheme (MCS). Note that the virtual cell ID is virtually allocated to the cell and that cells may have the same physical cell ID and different virtual cell IDs. The QCL information is information regarding QCL for a prescribed antenna port, a prescribed signal, or a prescribed channel. In a case that long term performance of a channel on which a symbol on an antenna port is carried can be estimated from a channel on which a symbol on another antenna port is carried, the two antenna ports are said to be quasi co-located (in a QCL state). The long term performance includes a delay spread, a Doppler spread, a Doppler shift, an average gain, an average delay, a spatial reception parameter, and/or a spatial transmission parameter. In other words, in a case that two antenna ports are quasi co-located (in a QCL state), the terminal apparatus can consider the two antenna ports to have the same long term performance. The subcarrier spacing indicates the subcarrier spacing of the interference signal or candidates for the subcarrier spacing that may be used in the band. Note that, in a case that the subcarrier spacing included in the assistance information differs from the subcarrier spacing used in communication with the serving cell, the terminal apparatus need not cancel or suppress the interference signals. The candidates for the subcarrier spacing that may be used in the band may indicate normally-used subcarrier spacings. For example, the normally-used subcarrier spacings need not include low-frequency subcarrier spacings as used for high-reliability, low-latency communication (emergency communication). The resource allocation granularity indicates the number of resource blocks involving invariable precoding (beamforming). The DMRS configuration indicates a PDSCH mapping type and additional DMRS allocation. The DMRS resource allocation varies with PDSCH mapping type. For example, for PDSCH mapping type A, DMRS is mapped to the third symbol in the slot. For example, for PDSCH mapping type B, DMRS is mapped to the first OFDM symbol in the allocated PDSCH resource. The additional DMRS allocation indicates whether there is additional DMRS allocation or indicates allocation to be added. Note that some or all of the parameters included in the assistance information are transmitted (configured) by the higher layer signaling. Some or all of the parameters included in the assistance information are transmitted in the downlink control information. In a case that each of the parameters included in the assistance information indicates multiple candidates, the terminal apparatus blindly detects a preferable one of the candidates. The parameters not included in the assistance information are blindly detected by the terminal apparatus.

In a case that the terminal apparatus communicates using multiple receive beam directions, surrounding interference conditions vary significantly depending on the receive beam direction. For example, an interference signal that is strong in one receive beam direction may be weaker in another receive beam direction. The assistance information regarding a cell that is unlikely to interfere strongly may not only be meaningless but may also be wastefully used for calculation in a case that whether a strong interference signal is being received is determined. Accordingly, the assistance information is desirably configured for each receive beam direction. However, the base station apparatus does not necessarily know the receive direction of the terminal apparatus, the information associated with the receive beam direction may be associated with the assistance information. For example, the terminal apparatus can associate CRI with the receive beam direction, and thus the base station apparatus can transmit (configure) one or more assistance information for each CRI. The terminal apparatus can also associate the time index of the synchronization signal block with the receive beam direction, and thus the base station apparatus can transmit (configure) one or more assistance information for each time index of synchronization signal block. The terminal apparatus can also associate the PMI (antenna port number) with the receive beam direction, and thus the base station apparatus can transmit (configure) one or more assistance information for each PMI (antenna port number). In a case that the terminal apparatus includes multiple subarrays, the receive beam direction is likely to vary with each subarray, and thus the base station apparatus can transmit (configure) one or more assistance information for each index associated with the subarray of the terminal apparatus. In a case that multiple base station apparatuses (transmission and/or reception points) communicate with a terminal apparatus, the terminal apparatus is likely to communicate in a receive beam direction different from the receive beam direction of each of the base station apparatus (transmission and/or reception points). Thus, the base station apparatus transmits (configures) one or more assistance information for each information indicating the base station apparatus (transmission and/or reception point). The information indicating the base station apparatus (transmission and/or reception point) may be a physical cell ID or a virtual cell ID. In a case that the base station apparatuses (transmission and/or reception points) used different DMRS antenna port numbers, the information indicating the DMRS antenna port number or the DMRS antenna group is used as the information indicating the base station apparatus (transmission and/or reception point).

Note that the number of assistance information configured for each CRI by the base station apparatus may be common. Here, the number of assistance information refers to the types of assistance information, the number of elements of each piece of assistance information (e.g., the number of candidates for the cell ID), and the like. A maximum value is configured for the number of assistance information configured for each CRI by the base station apparatus, and the base station apparatus can configure the assistance information for each CRI such that the number of assistance information is equal to or smaller than the maximum value.

Note that, in a case that the receive beam direction of the terminal apparatus varies, it is likely that the transmit antenna is not QCL. Accordingly, the assistance information can be associated with the QCL information. For example, in a case that the base station apparatus transmits (configures) assistance information regarding multiple cells, cells that are QCL (or cells that are not QCL) can be indicated to the terminal apparatus.

Note that the terminal apparatus cancels or suppresses the interference signals by using the assistance information associated with CRI used for communication with the serving cell.

The base station apparatus may also configure assistance information associated with the receive beam direction (CRI/time index of the synchronization signal block/PMI/antenna port number/subarray) and assistance information not associated with the receive beam direction (CRI/time index of the synchronization signal block/PMI/antenna port number/subarray). The assistance information associated with the receive beam direction and the assistance information not associated with the receive beam direction may be selectively used for the capability and category of the terminal apparatus. The capability and category of the terminal apparatus may indicate whether the terminal apparatus supports receive beamforming or not. The assistance information associated with the receive beam direction and the assistance information not associated with the receive beam direction may be selectively used in the frequency band. For example, the base station apparatus does not configure assistance information associated with the receive beam direction at a frequency lower than 6 GHz. For example, the base station apparatus configures assistance information associated with the receive beam direction only at a frequency higher than 6 GHz.

Note that CRI may be associated with the CSI resource set configuration ID. In a case of indicating CRI to the terminal apparatus, the base station apparatus may indicate CRI with the CSI resource set configuration ID. Note that, in a case that the CSI resource set configuration ID is associated with one CRI or one receive beam direction, the base station apparatus may configure the assistance information for each CSI resource set configuration ID.

The base station apparatus requests the terminal apparatus to perform neighbor cell measurements to learn neighbor cells associated with the receive beam direction of the terminal apparatus. The neighbor cell measurement request includes information associated with the receive beam direction of the terminal apparatus and a cell ID. In a case of receiving the neighbor cell measurement request, the terminal apparatus measures the RSRP/RSRQ/RSSI of the neighbor cells, and reports measurement results to the base station apparatus along with information associated with the receive beam direction of the terminal apparatus. Note that the information associated with the receive beam direction of the terminal apparatus is information indicating CRI, the time index of the synchronization signal block, the subarray of the terminal apparatus, or the base station apparatus (transmission and/or reception point).

In a case that the terminal apparatus moves, the surrounding environment may change from time to time. Accordingly, the terminal apparatus desirably observes the surrounding channel conditions, interference conditions, and the like at prescribed timings and report the conditions to the base station apparatus. Reporting results are reported in periodic reporting or event-driven reporting. For periodic reporting, the terminal apparatus periodically measures the RSRP/RSRQ by using the synchronization signal or CSI-RS and reports the measured RSRP/RSRQ. For event-driven reporting, an event ID is associated with a condition related to the reporting. The event ID is, for example, as listed below, and a threshold (threshold value 1 and threshold 2 as necessary) or an offset value needed to calculate the condition is also configured. Event A1: In a case that the measurement result for the serving cell is better than a configured threshold. Event A2: In a case that the measurement result for the serving cell is worse than the configured threshold. Event A3: In a case that the measurement result for the neighbor cell is better than the measurement result for the PCell/PSCell by a configured offset value or larger. Event A4: In a case that the measurement result for the neighbor cell is better than the configured threshold. Event A5: In a case that the measurement result for the PCell/PSCell is worse than the configured threshold 1 and the measurement result for the neighbor cell is better than the configured threshold 2. Event A6: In a case that the measurement result for the neighbor cell is better than the measurement result for SCell by a configured offset value or larger. Event C1: In a case that the measurement result with the CSI-RS resource is better than the configured threshold. Event C2: In a case that the measurement result on the CSI-RS resource is better than the measurement result at the configured reference CSI-RS resource by an offset amount or larger. Event D1: In a case that the measurement result on a CSI-RS resource different from CRI is better than a configured threshold. Event D2: In a case that the measurement result for the CSI-RS resource associated with CRI is worse than a configured threshold. Event D3: In a case that the measurement result in the receive beam direction not associated with CRI is better than a configured threshold. Event D4: In a case that the measurement result for the SS block index used for synchronization is worse than a configured threshold. Event D5: In a case that the measurement result for the SS block index not used for synchronization is worse than a configured threshold. Event E1: In a case that the time elapsed since the determination of the beam by the base station apparatus exceeds a threshold. Event E2: In a case that the time elapsed since the determination of the beam by the terminal apparatus exceeds a threshold.

In a case of reporting based on the reporting configuration, the terminal apparatus reports SS-RSRP/SS-RSRQ/CSI-RSRP/CSI-RSRQ/RSSI as a measurement result.

Figure 5:
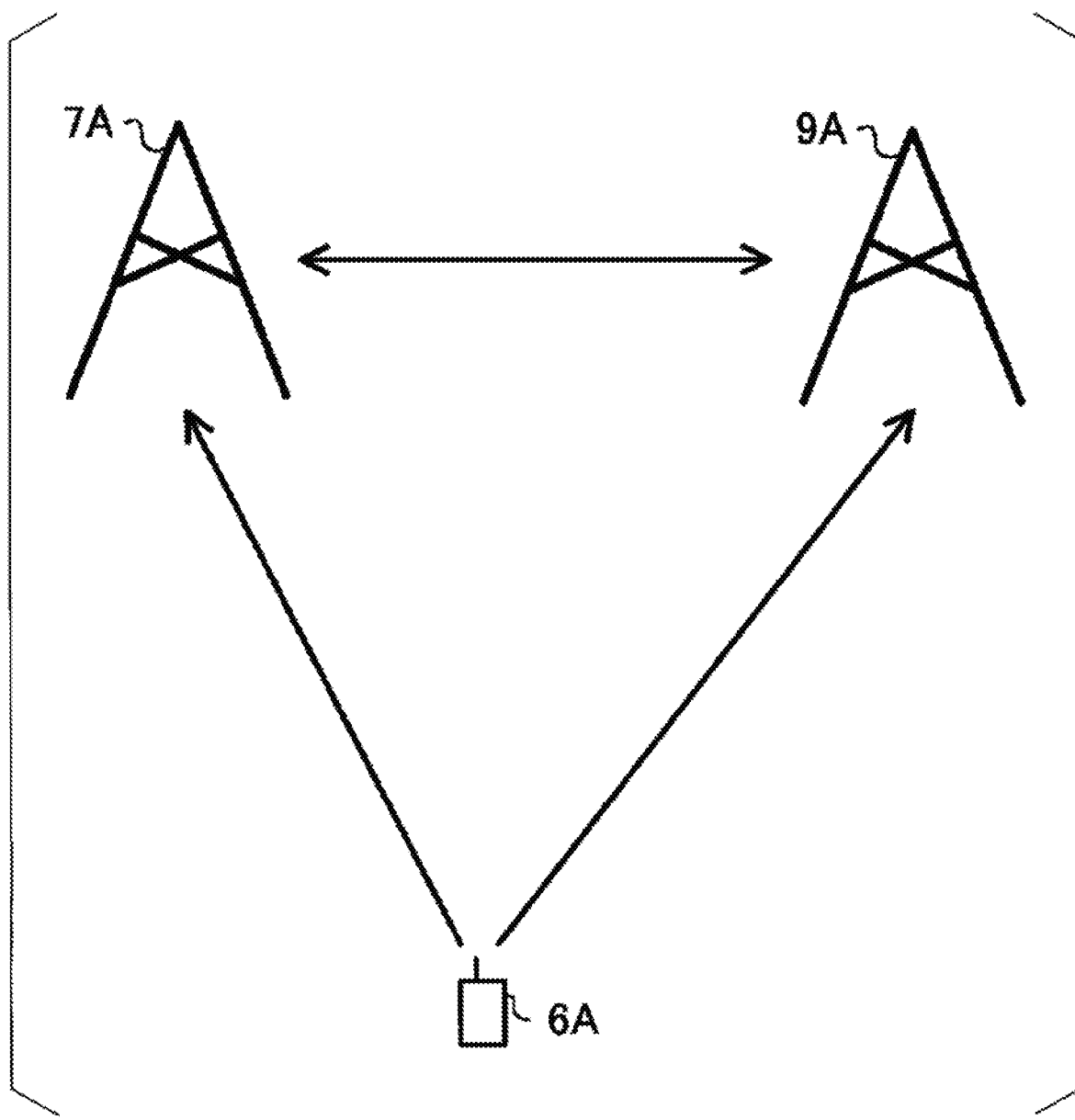
FIG. 5 is a diagram illustrating an example of a communication system according to the present embodiment.

FIG. 5 is a diagram illustrating an example of an uplink communication system according to the present embodiment. The communication system illustrated in FIG. 5 includes a base station apparatus 7A, a base station apparatus 9A, and a terminal apparatus 6A. The terminal apparatus 6A can use the base station apparatus 7A and/or the base station apparatus 9A as a serving cell. In a case that the base station apparatus 7A or the base station apparatus 9A includes a multiplicity of antennas, the multiplicity of antennas can be divided into multiple subarrays (panels or sub-panels), and transmit/receive beamforming can be applied for each subarray. In this case, each subarray may include a communication apparatus, and the configuration of the communication apparatus is the same as the configuration of the base station apparatus illustrated in FIG. 2, unless otherwise indicated. In a case that the terminal apparatus 6A includes multiple antennas, the terminal apparatus 6A can perform transmission and/or reception based on beamforming. In a case that the terminal apparatus 6A includes a multiplicity of antennas, the multiplicity of antennas can be divided into multiple subarrays (panels or sub-panels), and different transmit/receive beamforming can be applied for each subarray. Each subarray may include a communication apparatus, and the configuration of the communication apparatus is the same as the configuration of the terminal apparatus illustrated in FIG. 3, unless otherwise indicated. Note that the base station apparatus 7A and the base station apparatus 9A are also simply referred to as base station apparatuses. Note that the terminal apparatus 6A is also simply referred to as a terminal apparatus.

In the uplink, SRS is used to determine a preferable transmit beam for the terminal apparatus and a preferable receive beam for the base station apparatus. The base station apparatus can transmit (configure) configuration information regarding SRS by the higher layer signaling. The configuration information includes one or more SRS resource set configurations. The SRS resource set configuration includes an SRS resource set configuration ID and/or one or more SRS resource configurations. The SRS resource set configuration ID is used to identify the SRS resource set configuration. The SRS resource configuration includes an SRS resource configuration ID, the number of SRS antenna ports, an SRS transmission comb, SRS resource mapping, SRS frequency hopping, and an SRS resource configuration type.

The SRS resource configuration ID is used to identify the SRS resource configuration. The SRS transmit comb indicates the frequency interval of a comb toothed spectrum and a position (offset) within the frequency interval. The SRS resource mapping indicates OFDM symbol positions in the slot where SRS are allocated and the number of OFDM symbols. The SRS frequency hopping is information indicating frequency hopping of SRS. The SRS resource configuration type indicates the operation of the SRS resource configuration in the time domain. Specifically, the SRS resource configuration type indicates whether the SRS resource configuration corresponds to a configuration for aperiodic transmission of SRS, a configuration for periodic transmission of SRS, or a configuration for semi-persistent transmission of SRS. Note that, in a case of a configuration for semi-persistent transmission of SRS, SRS is periodically transmitted during a period from activation in the higher layer until deactivation.

In a case that multiple SRS resources are configured, the base station apparatus can determine a preferable SRS resource in a case that the terminal apparatus performs transmission in each SRS resource in different transmit beam directions. In a case that the base station apparatus transmits (indicates) the SRS Resource Indicator (SRI), including information indicating the SRS resource, to the terminal apparatus, the terminal apparatus can learn that the transmit beam direction of the transmission using the SRS resource is preferable. Note that the base station apparatus may request the terminal apparatus to use the same transmit beam for transmission during a prescribed period of time to determine a preferable receive beam for the base station apparatus. The terminal apparatus performs, in accordance with the request from the base station apparatus, transmission using the indicated SRS resource during the indicated period of time in the same transmit beam direction as that of the transmission with the indicated SRI.

In a case of including multiple subarrays, the terminal apparatus can communicate with multiple base station apparatuses (transmission and/or reception points). In the example illustrated in FIG. 5, the terminal apparatus 6A may use a base station apparatus 7A and a base station apparatus 9A as a serving cell. In this case, for the terminal apparatus 6A, the transmit beam direction preferable for communication with the base station apparatus 7A is likely to differ from the transmit beam direction preferable for communicating with the base station apparatus 9A. Accordingly, by performing transmission using different subarrays in different transmit beam directions, the terminal apparatus 6A can communicate with the base station apparatus 7A and with the base station apparatus 9A at the same timing.

In a case of transmitting SRS using a certain SRS resource and multiple antenna ports, the terminal apparatus can use different transmit beam directions at the respective antenna ports. In this case, in a case that the base station apparatus indicates, to the terminal apparatus, transmission with a preferable antenna port number, the terminal apparatus can learn a preferable transmit beam direction. Note that the base station apparatus can indicate a transmission PMI (TPMI) to the terminal apparatus by using a codebook for selection of an antenna port. The base station apparatus can indicate, to the terminal apparatus, which codebook to be referenced. With reference to the indicated codebook, the terminal apparatus may use the transmit beam direction corresponding to the antenna port number indicated by TPMI.

In a case that the terminal apparatus includes multiple subarrays and can perform transmission using the multiple subarrays at the same timing, the terminal apparatus can assign different antenna port numbers to the respective subarrays. At this time, in a case that the terminal apparatus transmits SRS by using transmit beams from different antenna ports of the subarrays and receives TPMI from the base station apparatus, the terminal apparatus can learn a preferable subarray and a preferable transmit beam direction. Accordingly, the terminal apparatus can associate TPMI with the subarray and the transmit beam direction.

Note that, in a case of communicating with multiple base station apparatuses (transmission and/or reception points), the terminal apparatus can transmit the same signal (data) or different signals (data) to the base station apparatuses (transmission and/or reception points). In a case that the terminal apparatus communicates with multiple base station apparatuses (transmission and/or reception points) by using the same signal (data), composing of the signal received by the multiple base station apparatuses (transmission and/or reception points) can improve reception quality, and thus the multiple base station apparatuses (transmission and/or reception points) desirably cooperate with one another in performing reception processing.

The base station apparatus can use DCI for scheduling of PUSCH. In a case that the terminal apparatus communicates with multiple base station apparatuses, each of the base station apparatuses can transmit DCI for scheduling of PUSCH. The DCI includes SRI and/or TPMI, and the terminal apparatus can learn a preferable transmit beam for the base station apparatus. In a case that the terminal apparatus communicates with the multiple base station apparatuses, the terminal apparatus can transmit PUSCH to the multiple base station apparatuses by using DCI from one of the base station apparatuses. For example, in a case that DCI includes control information for multiple layers (codewords or transport blocks) and that SRI and/or TPMI is indicated (configured) for each layer, each layer is transmitted in a transmit beam preferable for the corresponding base station apparatus. In this way, in a case of receiving one DCI, the terminal apparatus can transmit different signals (data) to the multiple base station apparatuses. In a case that DCI includes control information for one layer and that multiple SRIs and/or TPMIs are indicated (configured) for one layer, the terminal apparatus transmits one layer (the same data) by using different transmit beams. In this way, in a case of receiving one DCI, the terminal apparatus can transmit the same signal (data) to the multiple base station apparatuses.

In a case that the terminal apparatus performs transmission to the multiple base station apparatuses at the same timing, each base station apparatus desirably learns the quality of communication with the terminal apparatus at the same timing. Thus, the base station apparatus can use one DCI to indicate (trigger) multiple SRIs and SRS resources corresponding to the respective SRI. In other words, in a case that the terminal apparatus transmits SRS in the transmit beam direction corresponding to each SRI at the same timing, each base station apparatus can learn the quality of communication with the terminal apparatus at the same timing.

In a case that the subarrays included in the terminal apparatus are used only in one transmit beam direction at the same timing, the terminal apparatus performs transmission by using the different subarrays for the respective multiple base station apparatuses at the same timing. At this time, in a case that two SRIs are indicated (configured) by the base station apparatus by using one DCI and the two SRIs are associated with the same subarray, the terminal apparatus may fail to perform transmission corresponding to the two SRIs at the same timing. To avoid this problem, for example, the base station apparatus can configure and group multiple SRS resources and request the terminal apparatus to transmit SRS by using the same subarray within the resultant group. In a case that different subarrays are used among the groups, the base station apparatus can learn multiple SRIs for which the same timing can be configured. Note that the SRS resource group may be an SRS resource set. Note that it may be assumed that the SRSs (SRS resources) for which the same timing can be configured are not QCL. In this case, the terminal apparatus can transmit SRS in association with the QCL information. For example, in a case that the terminal apparatus transmits SRSs in QCL in distinction from SRSs not in QCL, the base station apparatus can avoid configuring the same timing for SRIs in QCL and can configure the same timing for SRIs not in QCL. The base station apparatus may request SRS for each of the subarrays of the terminal apparatus. In this case, the terminal apparatus transmits SRS for each subarray.

Note that, in a case that the base station apparatus indicates, to the terminal apparatus, two SRIs that cannot be transmitted at the same timing, the terminal apparatus can request the base station apparatus to perform a beam recovery procedure for selecting transmit beams again. The beam recovery procedure is a procedure performed in a case that the terminal apparatus has lost tracking of transmit and/or receive beams from the base station apparatus, leading to significantly degraded communication quality, and the terminal apparatus needs to acquire a new connection destination (transmit beam of the base station apparatus) in advance. The terminal apparatus according to the present embodiment has acquired a transmit beam itself, but can use the beam recovery procedure to overcome the situation where two SRIs are configured for which the same timing cannot be used for transmission.

Note that the frequency band used by the communication apparatus (base station apparatus and terminal apparatus) according to the present embodiment is not limited to the licensed band and unlicensed band described heretofore. Frequency bands to which the present embodiment is directed include frequency bands referred to as white bands (white spaces) and that are actually out of use for the purpose of preventing interference between frequencies or the like even though specific services are nationally or regionally licensed (e.g. frequency bands that are allocated for television broadcasting but are not used in some regions), and shared frequency bands (licensed shared bands) that have been exclusively allocated to a particular operator, but are expected to be shared by multiple operators in the future.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device.

Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the present invention of the present patent application is not limited to the above-described embodiments. According to the embodiment, apparatuses have been described as an example, but the present invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be preferably used in a base station apparatus, a terminal apparatus, and a communication method. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1A, 3A, 5A, 7A, 9A Base station apparatus
2A, 4A, 6A Terminal apparatus
101 Higher layer processing unit
102 Controller
103 Transmitter
104 Receiver
105 Transmit and/or receive antenna
106 Measuring unit
1011 Radio resource control unit
1012 Scheduling unit
1031 Coding unit
1032 Modulation unit
1033 Downlink reference signal generation unit
1034 Multiplexing unit
1035 Radio transmitting unit
1041 Radio receiving unit
1042 Demultiplexing unit
1043 Demodulation unit
1044 Decoding unit
201 Higher layer processing unit
202 Controller
203 Transmitter
204 Receiver
205 Measuring unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmitting unit
2041 Radio receiving unit
2042 Demultiplexing unit
2043 Signal detection unit

The invention claimed is:

1. A base station apparatus for communicating with a terminal apparatus, the base station apparatus comprising:
a higher layer processing unit configured to configure multiple channel state information reference signal (CSI-RS) resources and assistance information;
a transmitter configured to transmit CSI-RSs by using the multiple CSI-RS resources; and
a receiver configured to receive, from the terminal apparatus, a CSI-RS resource indicator (CRI) indicating one CSI-RS resource of the multiple CSI-RS resources, wherein the assistance information is information for assisting the terminal apparatus in cancelling or suppressing neighbor cell interference, wherein the assistance information includes at least one of a cell ID, a subcarrier spacing, a demodulation reference signal (DMRS) configuration, the number of DMRS antenna ports, power offset between a reference signal and PDSCH, or the number of layers, and wherein one or more of the assistance information is configured for the CRI.

2. The base station apparatus according to claim 1, wherein the multiple CSI-RS resources are divided into multiple groups, and wherein the CRI is received for each of the groups.

3. A terminal apparatus for communicating with a base station apparatus, the terminal apparatus comprising:
a higher layer processing unit for which multiple channel state information reference signal (CSI-RS) resources and assistance information are configured;
a receiver configured to receive CSI-RSs by using the multiple CSI-RS resources;
a measuring unit configured to generate channel state information (CSI) from the CSI-RSs; and
a transmitter configured to transmit the CSI to the base station apparatus, wherein the CSI includes a CSI-RS resource indicator (CRI) indicating one CSI-RS resource of the multiple CSI-RS resources, wherein the assistance information is information for assisting the terminal apparatus in cancelling or suppressing neighbor cell interference, wherein the assistance information includes at least one of a cell ID, a subcarrier spacing, a demodulation reference signal (DMRS) configuration, the number of DMRS antenna ports, power offset between a reference signal and PDSCH, and the number of layers, and wherein one or more of the assistance information is configured for the CRI.

4. The terminal apparatus according to claim 3, wherein the multiple CSI-RS resources are divided into multiple groups, and wherein the CRI is determined for each of the groups.

5. The terminal apparatus according to claim 3, wherein the transmitter transmits a downlink shared channel and CRI associated with demodulation of the downlink shared channel, and wherein the transmitter cancels or suppresses an interference signal by using the assistance information associated with the CRI that indicates the one CSI-RS resource.

6. A communication method for a base station apparatus for communicating with a terminal apparatus, the communication method comprising the steps of:
configuring multiple channel state information reference signal (CSI-RS) resources and assistance information;
transmitting CSI-RSs by using the multiple CSI-RS resources; and
receiving, from the terminal apparatus, a CSI-RS resource indicator (CRI) indicating one CSI-RS resource of the multiple CSI-RS resources, wherein the assistance information is information for assisting the terminal apparatus in cancelling or suppressing neighbor cell interference, wherein the assistance information includes at least one of a cell ID, a subcarrier spacing, a demodulation reference signal (DMRS) configuration, the number of DMRS antenna ports, power offset between a reference signal and PDSCH, or the number of layers, and wherein one or more of the assistance information is configured for the CRI.

7. A communication method for a terminal apparatus for communicating with a base station apparatus, the communication method comprising the steps of:
configuring, for the terminal apparatus, multiple channel state information reference signal (CSI-RS) resources and assistance information;
receiving CSI-RSs by using the multiple CSI-RS resources;
generating channel state information (CSI) from the CSI-RSs; and
transmitting the CSI to the base station apparatus, wherein the CSI includes a CSI-RS resource indicator (CRI) indicating one CSI-RS resource of the multiple CSI-RS resources, wherein the assistance information is information for assisting the terminal apparatus in cancelling or suppressing neighbor cell interference, wherein the assistance information includes at least one of a cell ID, a subcarrier spacing, a demodulation reference signal (DMRS) configuration, the number of DMRS antenna ports, power offset between a reference signal and PDSCH, or the number of layers, and wherein one or more of the assistance information is configured for the CRI.

* * * * *